United States Patent [19]

Akutsu

[11] Patent Number: 4,661,985
[45] Date of Patent: Apr. 28, 1987

[54] PROCESS FOR MEASURING LAMINA SIZE DISTRIBUTION

[75] Inventor: Takao Akutsu, Tokyo, Japan

[73] Assignee: Japan Tobacco, Inc., Japan

[21] Appl. No.: 684,369

[22] Filed: Dec. 20, 1984

[30] Foreign Application Priority Data

Dec. 23, 1983 [JP] Japan .............................. 58-242087

[51] Int. Cl.⁴ .................. G06K 9/00; A24C 1/00; H04N 7/18
[52] U.S. Cl. ..................................... 382/8; 358/107; 356/380; 382/1; 382/28
[58] Field of Search ................ 382/1, 8, 28; 358/107; 356/379, 380

[56] References Cited

U.S. PATENT DOCUMENTS

| | | |
|---|---|---|
| 3,824,393 | 7/1974 | Brain . |
| 4,015,108 | 3/1977 | Morton . |
| 4,115,803 | 9/1978 | Morton ................................. 382/28 |
| 4,203,029 | 5/1980 | Kitchener et al. . |
| 4,296,405 | 10/1981 | Rich ........................................ 382/8 |
| 4,327,375 | 4/1982 | Leclerc .............................. 358/107 |
| 4,400,728 | 8/1983 | Long .................................... 358/107 |
| 4,443,855 | 4/1984 | Bishop et al. ...................... 358/107 |
| 4,472,057 | 9/1984 | Wurm et al. ........................ 356/380 |

FOREIGN PATENT DOCUMENTS 2123143 1/1984 United Kingdom .

OTHER PUBLICATIONS

IBM Technical Disclosure Bulletin, vol. 25, No. 10, Mar. 1983, An Algorithm for Segmenting Juxtaposed Objects, vol. 13, No. 5, Oxford, 1o23 Pattern Recognition.
Boundary Detection of Radiographic Images by a Threshold Method Information Processing 1971.
European Patent Search Official Action 0,147,802.

Primary Examiner—Howard A. Birmill
Attorney, Agent, or Firm—Lowe, Price, Leblanc, Becker & Shur

[57] ABSTRACT

A process for measuring the lamina size distribution comprises the steps of uniformly spreading sampled laminae over a conveyor and transporting the same; image-forming the conveyed lamina at a detection region having a given area by using a television camera each time when the lamina moves by a length corresponding to that of the detection region; storing in a memory binary video data which are converted from the video signal obtained by the image-forming; processing the stored video data to encircle continuous ones of the binary data which correspond to the lamina with a rectangular frame; counting the number of continuous ones of the binary data; converting the continuous ones of the binary data in the frame into the other ones binary data after counting; successively carrying out the same processing of different continuous ones of binary data to calculate the size of respective laminae; and measuring the distribution of the lamina size upon the basis of the calculation results.

4 Claims, 24 Drawing Figures

PROCESS FOR MEASURING LAMINA SIZE DISTRIBUTION

BACKGROUND OF THE INVENTION

The present invention relates to a process for measuring the size distribution of laminae which are sampled and conveyed by a conveyor after treating raw material for the purpose of controlling the lamina size in a raw material tobacco leaf treatment line.

In a tobacco production process, tobacco leaves, as raw material, are generally separated from one another and flexibility is imparted to the tobacco leaves by application of water and steam by a moisture control machine. Thereafter they are stripped into parenchyma (hereafter referred to as lamina) and veins (hereafter referred to as ribs) and are separated by a separating machine. The laminae are dried to possess a moisture rate of about 12% so that they are prevented from deterioration and from getting moldy during a long preservation. After the dried laminae are packed in a container such as a barrel (the afore-mentioned process is referred to as raw material treatment process), the laminae are preserved for a long time for maturization. The matured laminae are subjected to treatments such as leaf orientation, blending and flavoring and are then cut into cut tobacco leaves.

The tobacco leaves are stripped into laminae and ribs by the rib removing machine in the raw material treatment process. The degree of this stripping process has a great influence upon the yield and the quality of the raw material. That is, since the tobacco leaves are subjected to great mechanical action when the tobacco leaves are stripped into laminae and ribs, frequently the laminae and the ribs are insufficiently stripped or excessively stripped so that the laminae are finely divided, depending upon the physical properties possessed by the tobacco leaves (these physical properties are substantially determined by the moisture and the temperature possessed by the tobacco leaves) and upon the mechanical impact force of the rib removing machine.

It is thus important to control a factor which influences quality, that is, the mechanical impact imparted to the tobacco leaves contained in the rib removing machine so that the impact is at a magnitude suitable for the tobacco leaves.

Presetting of the mechanical impact force heretofore has been manually carried out. Since the physical characteristics inherent to the tobacco leaves largely change depending on the production locations and on the weather of the produced year, it is very difficult to manually adjust the mechanical impact exerted by the rib removing machine to compensate for constantly changing characteristics of the tobacco leaves and to control the lamina size to an optimum value for managing the quality.

The present inventors hve proposed in Japanese Patent Application No. 58-131980 an apparatus for controlling the lamina size in a tobacco raw material treatment process line, comprising means for measuring lamina yielding ratio in the raw material treatment line in which the tobacco leaves, to which moisture and steam are imparted by a moisture control machine, are stripped into laminae and ribs by using a rotary rib removing machine in which mechanical impact imparted to the tobacco leaves may be changed and the laminae and the ribs are then separated from each other by a separating machine and arithmetic operation means into which a measurement signal from the measuring means is applied as a feed back signal and for searching a rotational number of the rotary rib removing machine as a manipulating factor which provides an optimum lamina size, whereby the mechanical impact force in the rib removing machine is automatically controlled in response to the result of treatment of the raw material tobacco leaves to provide an optimum lamina size.

Figures 1, 2, 3, 4, 5:
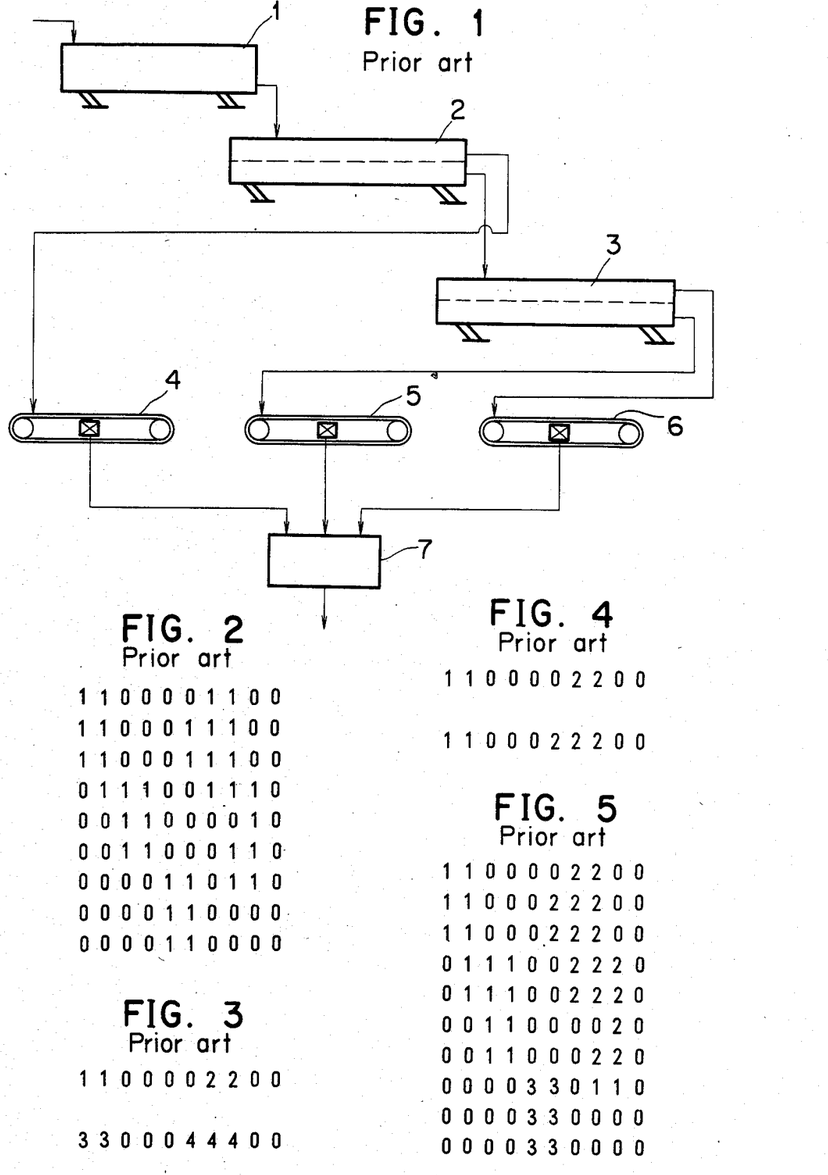

In the afore-mentioned measuring means of the proposed apparatus, the laminae are sampled from the raw material treatment line, and the sampled laminae are spread over a vibration conveyor 1 in width and longitudinal directions as shown in FIG. 1 and, the spread laminae are passed through two vibration sieves, the sieves having 25 mm and 13 mm meshes respectively, to be separated at these steps. The weight of respective screened laminae are measured by three continuous weight meters 4, 5 and 6. The lamina yielding ratio are calculated by the arithmetic operation unit 7 upon the basis of the measurement results. Therefore the measuring means has many problems as follows:

(1) The apparatus is large.
(2) Vibration and noise are high.
(3) Laminae are destroyed and to become small.
(4) Much dust is formed.
(5) Lamina size distribution which does not fall in mesh size cannot be obtained.
(6) Measurement error due to water content in tobacco and rib mixture ratio is large.
(7) Measuring is time consuming.

In order to overcome the above-mentioned problems, the size distribution of a lot of laminae having an indeterminate form is continuously measured in simultaneous, non-contact and non-destructive manner.

For this purpose, there is provided a method in which laminae are uniformly spread over a transporting conveyor so that they are not overlapped and the images of the laminae conveyed on the conveyor at predetermined areas are detected by a television camera and the video signal thus obtained is processed to provide the distribution of the lamina size.

Two methods of processing the video signal have heretofore been known. One of them is referred to as a scan (label) method which is used for colouring computer-aided animation. Upon the basis of the video signal, video data including "1" and "0" in response to picture elements are stored in a memory as shown in FIG. 2. The stored video data are scanned horizontally from the upper first line of the frame. A label No. 1 is given to a first continuous "1" region and the scanning is continued to give a label No. 2 to the next continuous "1" region (FIG. 3). Next, the second line is scanned to provide label Nos. "3" and "4" in a manner similar to that in the first line (FIG. 3). Subsequently if the label regions of lines 1 and 2 are continued, a label No. which is the same as that in the first line is given to the second line to unit the labels (FIG. 4). The operation mentioned above is carried out over the entire frame to provide video data as shown in FIG. 5.

In accordance with the video data, the number of picture elements having the same label number are counted to obtain the size of a lamina, that is, the area of a lamina.

Figure 6A:
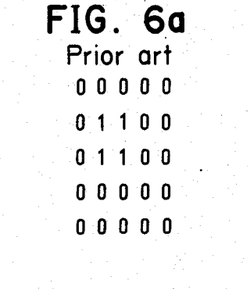
Figure 6B:
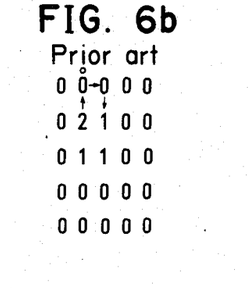
Figure 6C:
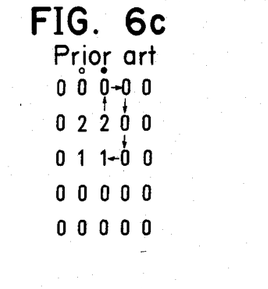
Figure 6D:
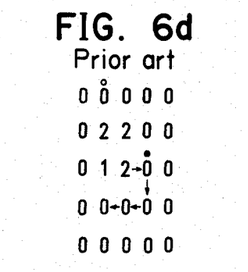
Figure 6E:
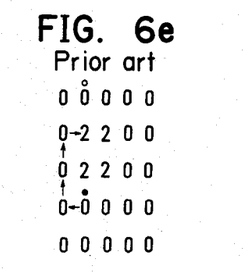
Figure 6F:
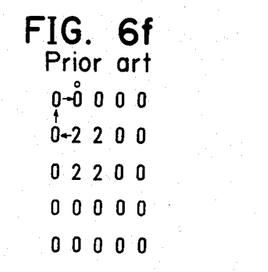

The other method is referred to as the border following method which is used for detecting a contour line. The video data (FIG. 6a) which are obtained in a manner similar to the case of FIG. 2 are horizontally scanned from the first upper line. A picture element "1" is provided with a label No. In this case, label number "2" is given (FIG. 6b). A picture element "1" is searched clockwise from a circled picture element above "2" in FIG. 6b. If this is a picture element "1" a label No. 2 is given to this picture element (FIG. 6c). In FIG. 6c similar search is conducted from a black dot picture element. Border following is completed when a circled picture element is found out be repeating the operations in FIGS. 6d to 6f. After detecting the contour line, the number of picture elements encircled by the contour line is counted so that the counts are considered as the area of the lamina.

The former method involves a relatively smaller error than that of the latter which it makes the unification of the labels tedious when the shape of the lamina is complicated. The latter method is capable of determining the area of a complicated shape while it does involve an error when the lamina has a pinhole. Each method has different features. Both algorithms are complicated and the memory capacity required for video data processing is several bits per picture element.

Accordingly both systems are disadvantageous in that a high capacity memory is necessary.

SUMMARY OF THE INVENTION

The present invention was made in order to eliminate the disadvantages of the prior art mentioned above.

It is an object of the present invention to provide a novel process for measuring the lamina size distribution.

It is another object of the present invention to provide a process for measuring the distribution of lamina size in which a video signal is obtained so that the lamina size distribution of the tobacco having an indeterminate shape is continuously measured in a non-contact and non-destructive manner and so that the video signal processing may be carried out by using a small capacity memory.

The purpose of the present invention is accomplished by providing a process for measuring the lamina size distribution comprising the steps of uniformly spreading sampled laminae over a conveyor and transporting the same; forming an image of the conveyed lamina at a detection region having a given area by using a television camera each time when the lamina moves by a length corresponding to that of the detection region; storing in a memory binary video data which are converted from the video signal obtained by the image-forming; processing the stored video data to encircle continuous ones of the binary data which correspond to the lamina with a rectangular frame; counting the number of continuous ones of the binary data; converting the continuous ones of the binary data in the frame into the other ones binary data after counting; successively carrying out the same processing of different continuous ones of binary data to calculate the size of respective laminae; and measuring the distribution of the lamina size upon the basis of the calculation results.

In another aspect of the present invention there is provided a process for measuring the lamina size distribution comprising the steps of uniformly spreading sampled lamina over a conveyor and transporting the same; forming images of the conveyed lamina at a detection region having a given area by means of a television camera each time when the lamina moves by a length corresponding to that of the detection region; storing in a memory binary video data which are converted from the video signal obtained by the image-forming; processing the stored video data to encircle continuous ones of the binary data which correspond to the lamina with a rectangular frame; obtaining the distribution of the continuous ones the binary data in the frame along the plurality of array axes; separating the continuous ones of the binary data within the frame at a valley and counting the number of the separated continuous ones of the binary data when both conditions are met that the distribution has at least two peaks and that there is a certain relation between the peaks and the valley; counting the number of the continuous ones of the binary data within the frame when said conditions are met; converting the ones of the binary data within the frame into the other ones of the binary data after counting; thereafter successively carrying out the same operations of different continuous ones of the binary data to calculate the size of respective lamina; and measuring the lamina size distribution upon basis of the calculation results.

BRIEF DESCRIPTION OF THE DRAWINGS

FIG. 1 is a schematic view showing an apparatus for carrying out a conventional lamina size distribution measuring method;

FIGS. 2 to 6f are views for explaining a conventional video data processing method;

DETAILED DESCRIPTION OF THE INVENTION

The present invention will be described by way of an embodiment with reference to the drawings in detail.

Figure 7:
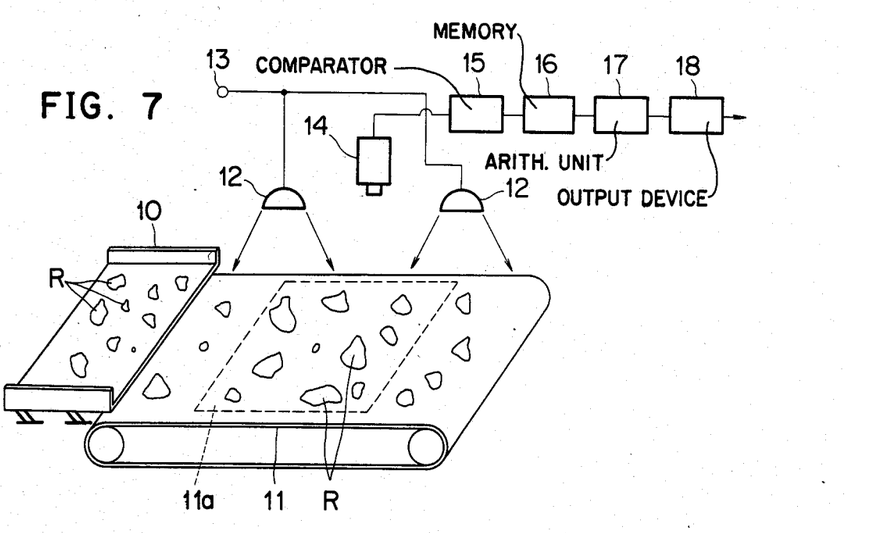
FIG. 7 is a schematic view showing a lamina sie distribution measuring apparatus for carrying out a process of the present invention.

FIG. 7 is a schematic view showing an apparatus embodying a measurement process of the present invention. Reference numeral 10 designates a spreading mechanism including for example a vibration conveyor, which is adapted to uniformly spread the laminae R over a transporting conveyor 11, the laminae having been sampled from a raw material tobacco leaves treatment line (not shown) so that the laminae R will not be overlapped. 12 designates illuminators disposed just above the conveyor 11, 13 a power source of the light projector, 14 a television camera just above the conveyor 11, 15 a comparator unit, 16 a memory unit, 17 an arithmetic operation unit, and 18 an output device.

In FIG. 7 the laminae R which have been sampled are spread over the transporting conveyor 11 in width and longitudinal length by means of the spreading mechanism 10 carried by the conveyor 11. The laminae R, which are spread over the entire conveyor 11 are illuminated at uniform ilumination at a detection region 11a on conveyor 11 by the illuminators so that the images of the laminae R at the detection region 11a are detected by the television camera 14 where it is converted into an electric signal relating to video image.

Figures 8, 9, 10, 11, 12:
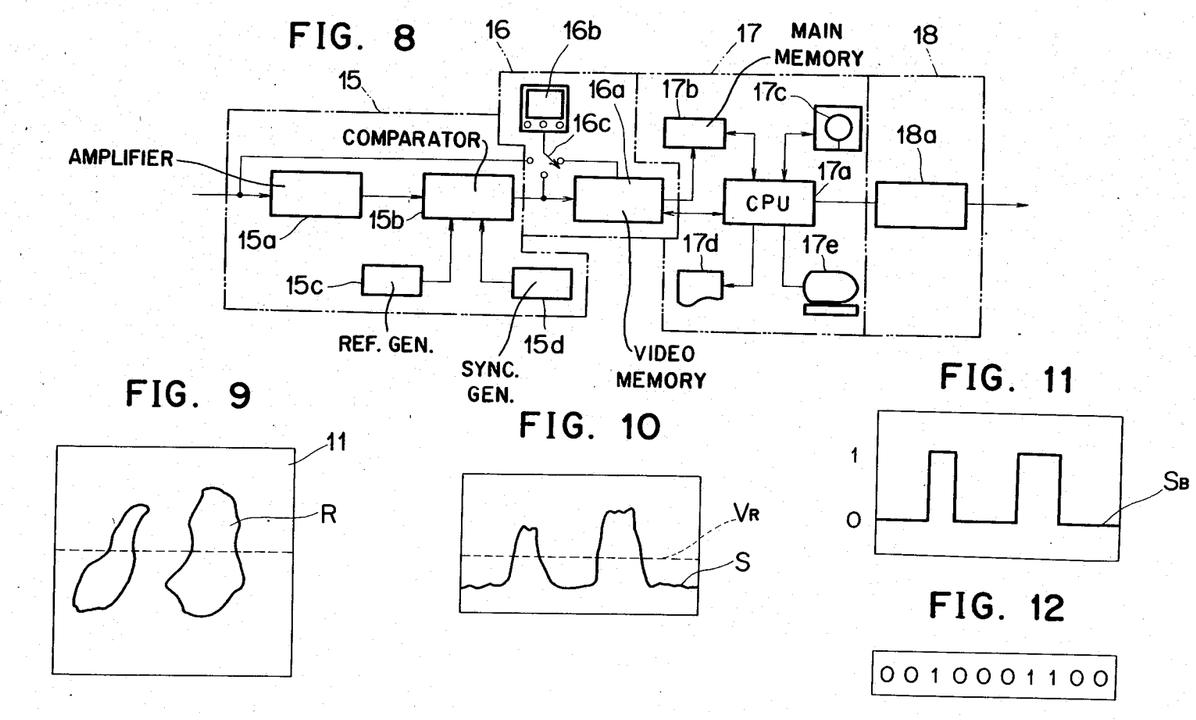
FIG. 8 is a block diagram showing the details of the apparatus of FIG. 7.
FIGS. 9 to 12 are views for explaining the operation process for converting video signal into binary video data.

The video electric signal is applied to the comparator unit 15 where it is converted into picture element signals. In order to do this, in the comparator unit 15 the electric signal is amplified to provide a signal having an amplitude by an amplifier 15a about ten times as high as the input signal and the amplified signal is compared which a reference voltage from a reference voltage generator 15c by a comparator 15b as shown in FIG. 8.

If the signal is higher than the reference voltage the comparator outputs a "1" level signal and if the signal is lower than the reference voltage the comparator provides a "0" level signal to provide binary signals. The comparator 15b samples only the video signal of the electric signals in response to a timing signal from a synchronization signal generating circuit 15d, so that another signal such as a fly-back line is not sampled. As mentioned above, the digital or binary signal which is obtained as a picture element signal in the comparator 15b is fed to a memory unit 16.

The memory unit 16 includes a video memory 16a, which stores the digital data from the comparator unit 15 as video data, and a monitor television set 16b, which monitors the video image represented by the signal stored in the video memory 16a. The input of the television set 16b is provided with a switch 16c so that the signal from the television camera 14 and the comparator unit 15 is selectively and directly monitored by the television 16b.

The video data stored in the video memory 16a is directly transferred to a main memory device 17b without passing through CPU 17a under control of a central processing unit (CPU) 17a of the arithmetic operation unit 17. That is, the data are DMA (direct memory access) transferred. The data stored in the main memory device 17b is random read out by the CPU 17a and is used so that the sizes of the laminae are calculated and the lamina size distribution is obtained upon basis of the calculated size. The lamina size distribution obtained by the CPU 17a is stored in a floppy disc device 17c and printed by a printer 17d if necessary. The control of these devices is carried out while watching a console display 17e having a key board.

The lamina size distribution signal output from the arithmetic operation unit 17 is converted into an analog signal by a digital to analog convertor (D/A C) of the output device and output as a control signal for changing the operation control signal for changing the operational conditions of the treating machines in the aforementioned raw material tobacco leaf treatment line.

The operation of the apparatus having the afore-mentioned arrangement will be described in detail.

If the video image of the laminae R at a part of the detection region 11a on the transporting conveyor 11 (FIG. 7) is assumed to be one shown in FIG. 9, an electric signal S as shown in FIG. 10 is obtained at an output of the television camera 14 when the path represented by a dotted line in the drawing is scanned. The electric signal S is compared with a reference voltage $V_R$ by the comparator unit 15 where it is converted into a binary electric signal $S_B$ as shown in FIG. 11. The binary signal is sampled and stored in the memory unit 16 in a form as shown in FIG. 12. Numerals "1" and "0" correspond to the part of the laminae and the background on the conveyor 11 respectively.

Figure 13:
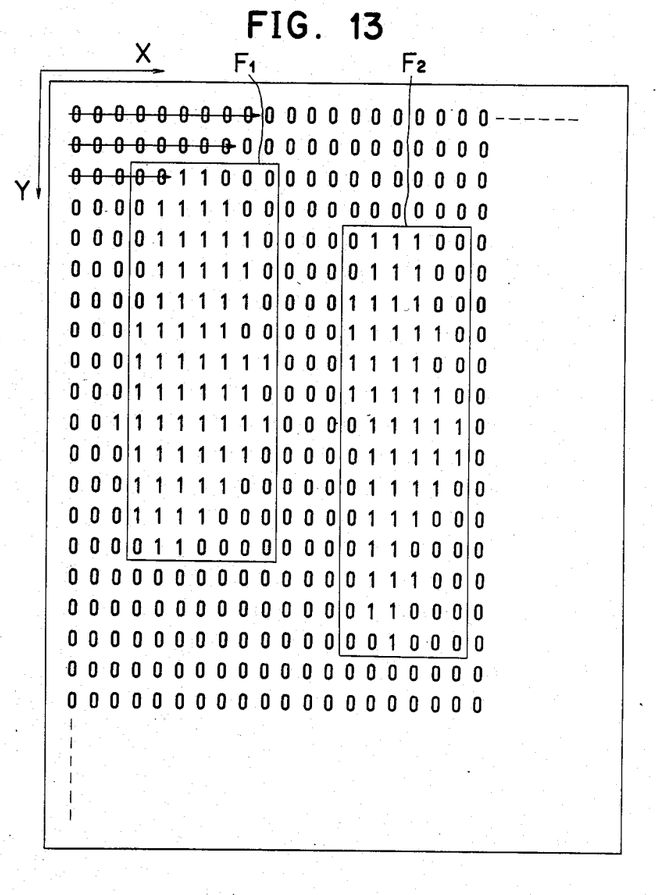
FIG. 13 is a view for explaining an example of the video data to be stored in a video memory.

If a part of the video data which is stored in the video memory 16a of the memory unit 16 and transferred to the main memory device 17b of the arithmetic operation unit 17 as shown in FIGS. 9 to 12 is assumed to be one shown in FIG. 13, the CPU processes the data stored in the memory device 17b in accordance with a predetermined program which will be hereafter described and makes a frame $F_1$ which surrounds a group of the numerals "1" representative of the lamina area and counts the number of numerals "1" in the frame. The number of the numerals "1" represents the size of a lamina. A similar operation is carried out with respect to a frame $F_2$ to calculate the sizes of the respective laminae.

After the calculation of the sizes of respective laminae over an entire detection area 11a on the conveyor 11 in the arithmetic operation unit 17 is completed, the video image at a subsequent area is inut by the television camera 14. For this purpose, the conveyor 11 moves by a length corresponding to that of the detection region 11a by the time the size calculation is completed in the arithmetic operation unit 17 since the one video image on the detection region 11a has been input and the speed of the movement is preset so that the subsequent video input does not overlap the prior video input and the adjacent video inputs are discontinued. This makes it possible to continuously measure the size of the laminae on the conveyor 11.

Figure 14:
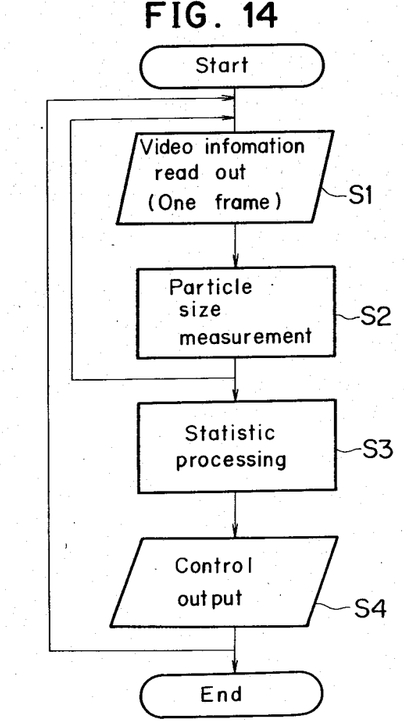
FIG. 14 is flow chart showing the brief operation of a part of the apparatus of FIG. 8.

FIG. 14 is a flow chart showing an outline of the data processing in the arithmetic operation unit 17. One frame of video data corresponding to the detection region is transferred from the memory unit 16 at step $S_1$. The sizes of the laminae are calculated upon the basis of the data. After the size measurement of a given amount of sampled laminae is finished by repeating this size calculation, the data on sizes obtained by the measurement are statistically processed at step S3. For example, preparation of histogram of respective sizes, calculation of the average, variation and the like is carried out. Among them, the data required for changing the manipulation conditions of the treatment machine in the treatment line for the tobacco leaves are output at step S4.

Figure 15:
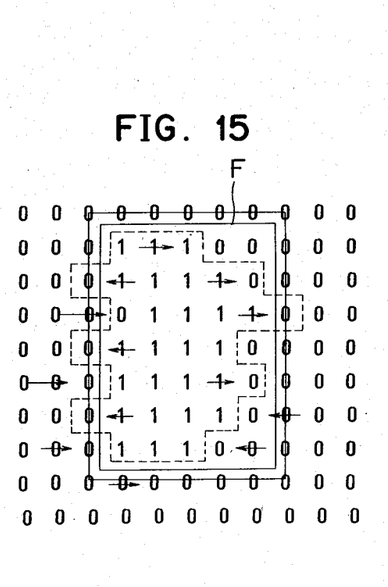
FIG. 15 is a view showing the concept of a frame preparation.
Figure 16:
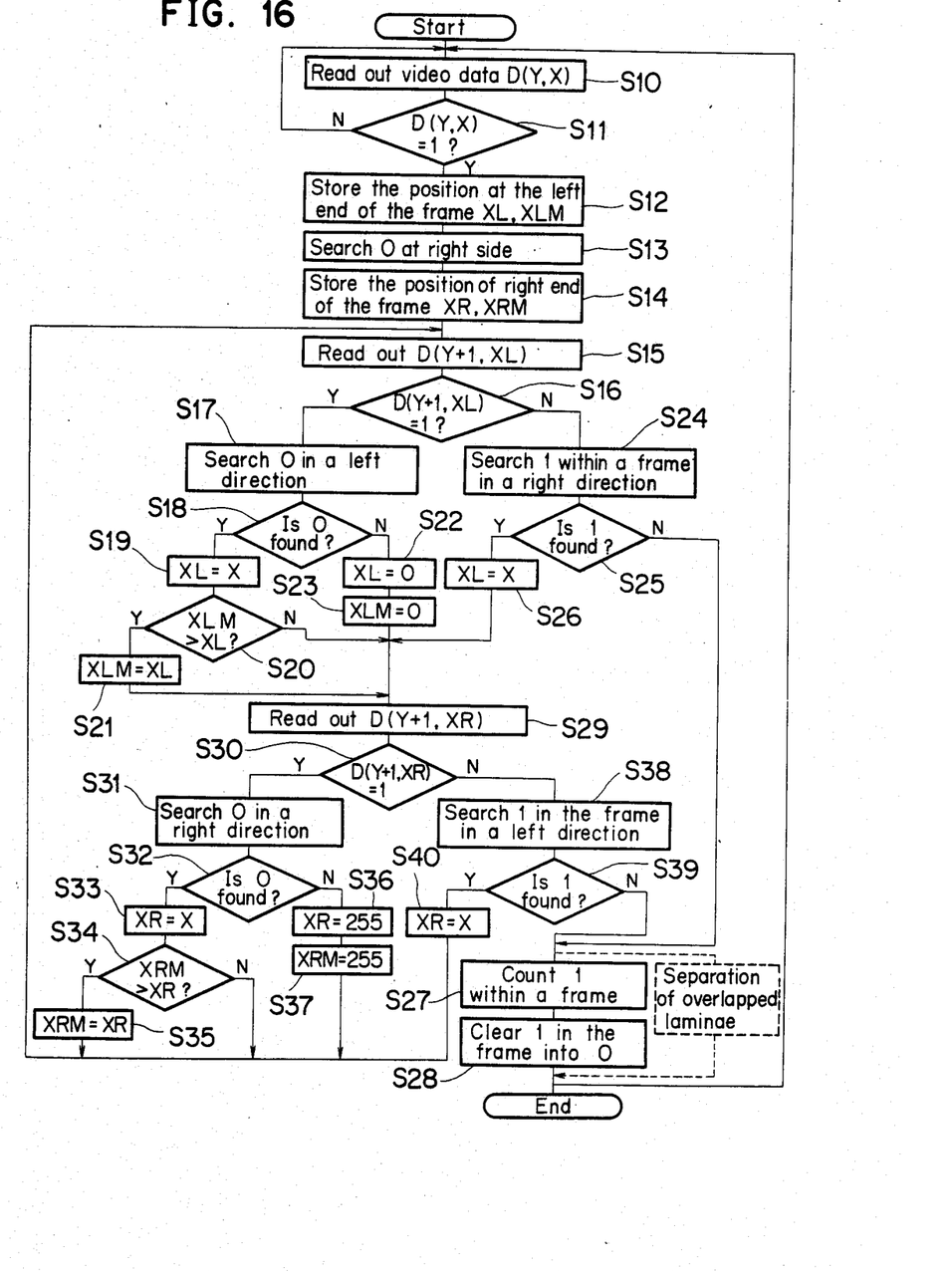
FIG. 16 is a flow chart showing the operation for frame preparation.

The steps for preparing the frames $F_1$ and $F_2$ shown in FIG. 13 will now be described with reference to FIGS. 15 and 16 showing the concept of frame preparation and the flow chart of frame preparation respectively.

The video data obtained by the television camera 14 in the detection region 11a of the conveyor 11 are stored in the video memory 16a of the memory unit 16 in the form shown in FIG. 13. In the embodiment, the memory 16a stores 256 bits in an x axis and 240 bits a Y axis, that is $256 \times 240 = 61440$ bits of secondary picture element data D(X,Y) per frame. These data are transferred from the video memory 16a to the main memory device 17a. The video data D(X,Y) transferred to the main memory device are serially read out from the leftmost end along the abscissa axis X at step S10 of FIG. 16. The read out data D(X,Y) are judged to determine whether or not the numeral "1" is represented to find out numeral "1" at step S11. If numeral "1" is not found until the right end as shown in FIG. 15, the numeral "1" will be similarly searched in the next lower line.

If numeral "1" is found and a determination at step S11 is YES, the left and leftmost ends of the line are stored as XL and XLM respectively at step S12. Thereafter numeral "0" is searched in a right direction along the same line at step S13. If numeral "0": is found, the right and rightmost ends of the line are stored assuming the numeral "1" is discontinued at next step S14. The left end (Y+1, XL) of the next line is read out at next step S15. A determination of whether the read D(Y+1, XL) is numeral "1" or not is carried out at next step S16.

If the determination result is YES as shown in FIG. 15, numeral "0" is searched in a left direction at the next step S17 and at next step S18 the determination of whether or not numeral "0" is found is carried out. If the judgement result is YES, the found position X is replaced with the precedent left end XL at next step S19. Thereafter the leftmost end XLM of the frame is compared with a new left end XL and a determination of whether or not XLM>XL, that is, if X is positioned in the left the XLM is carried out. If X is positioned in the left of XLM, and the result is YES, the value XL is input to XLM at next step S21.

If the numeral "0" is not found and the judgement result is YES at step S18, 0 is input to XL and XLM assuming them to be positioned at the leftmost position of the frame at step S23.

For example, if D(Y+1, XL) is not "1" as shown in the line 3 of FIG. 15 and the judgement is NO at step S16, numeral "1" is then searched in a right direction in the frame F at step S24 and a determination as to whether or not numeral "1" is found is carried out at step S25. If the numeral "1" is found and the result of the determination is YES, the position is stored as the left end XL.

If the numeral "1" is not found in line 9 of FIG. 11 and the result of the determination at step S25 is NO, it is assumed that the frame F is completed and the number of the numerals "1" within the frame F defined by the uppermost end Y, the lowermost end, the leftmost end XLM and rightmost end XR, is counted at step S27. Thereafter numerals "1" within the frame F are replaced with "0" at next step S28. The program returns to the step S10 in order to search the numeral "1" again from the first position D(X,Y).

If the judgement at the step S20 is NO, or after the completion of the steps S21, S23 and S26, the program will go to step S29. The right end D(Y+1, XR) in the next line is read out at step S29 and the judgement whether or not D(Y+1, XR) is numeral "1" is carried out at step S30.

Since D(Y+1, XR) is "1" in line 2 of FIG. 15 and the result of the determination is YES, numeral "0" is searched in a right direction at next step S31. As the result of this search, a judgement of whether or not numeral "0" is found is carried out at step S32. If the judgement result is YES, the found position X replaces the precedent right end XR at step S33. Thereafter the rightmost end XRM is compared with a new right end XR at step S34 and judgement whether or not XRM<XR, that is, whether or not XR is positioned in the right of XRM is carried out at step S34. If the judgement results is YES, the program returns to step 15 after inputting XR into XRM at next step S35. If the judgement result is NO, the program immediately returns to step S15.

If numeral "0" is not found as a result of the step 32, 225 is input to XR and XRM by assuming the rightmost end position in the frame at steps S36 and S37.

For example if D(Y+1, XR) is not numeral "1" as shown in line 5 of FIG. 15 and the judgement result at step S30 is NO, numeral "1" is then searched for in a left direction in frame F at step S38 and the judgement of whether or not numeral "1" is found is carried out at the following step S39. If the numeral "1" is found and the judgement result is YES, the position X is then stored as the right end XR and then program returns to step S15.

If the judgement is NO at step S39 and numeral "1" is not found, the frame F is then assumed to be completed. The program goes to step S27 and the number of numerals "1" within frame F is counted and the program then goes to step S28. The program returns to step S10 in a manner similar to that mentioned above after step S28.

Although the above mentioned decription is made under an assumption that the laminae are completely spread so that they are separated from each other at the detection region 11a of of the conveyor 11, the laminae are often partially overlapped at the detection region 11a. If two overlapped laminae are counted as one lamina and the size is calculated, an error is involved for subsequent various processing so that the accurate measurement of the lamina size distribution cannot be accomplished in this case.

Therefore the way of measuring the lamina size when the laminae are overlapped will be described with reference to FIG. 17 and subsequent figures.

Figure 17:
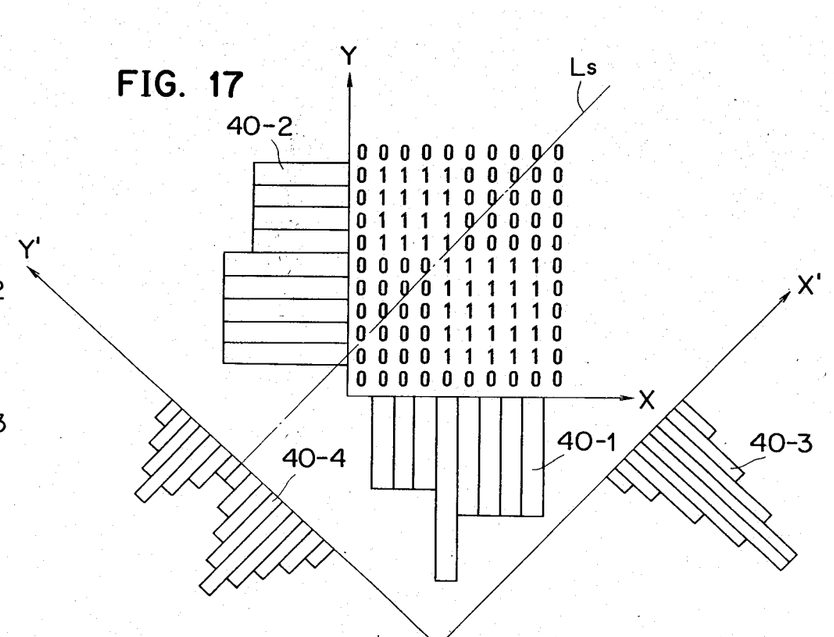
FIG. 17 is a view showing the concept of separation for overlapped laminae.
Figure 18:
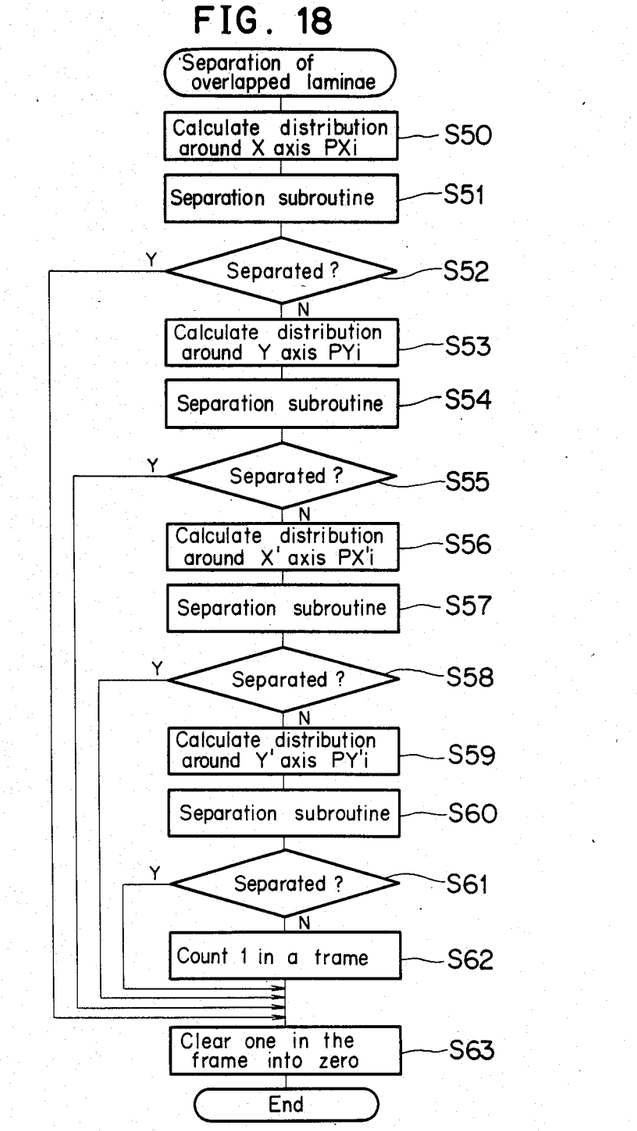
FIG. 18 is a flow chart showing the separation of overlapped laminae.
Figure 19:
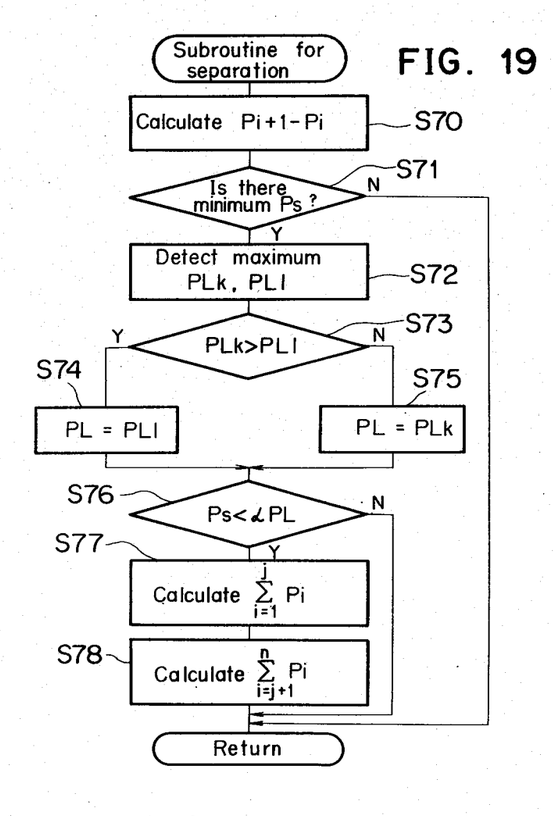
FIG. 19 is a flow chart showing a subroutine in the flow chart of FIG. 18.

FIG. 17 is a view illustrating the concept of separation of the overlapped laminae, FIG. 18 is a flow chart showing the separation of the overlapped laminae, and FIG. 19 is a separation subroutine. The flow chart of FIG. 18 is inserted as represented by dotted line in lieu of steps S27 and S28 in FIG. 16.

Now the video data shown in FIG. 17 are assumed to be stored in the video memory designated by 16a in FIG. 8. The data are transferred to the main memory device 17b of the arithmetic operation unit 17 and the processing of the steps S10 to S40 shown in FIG. 16 is carried out to determine a frame F. After the frame F has been determined, the number of numerals "1" extending in a Y axis, that is a variable $P_{xi}$ is calculated in an X axis direction at steps 50 of the flow chart of FIG. 18 to obtain a distribution $P_{xi}$ around the X axis designated by a reference numeral 40-1 in FIG. 17. Thereafter a separation subroutine of FIG. 19 is executed at next step S51.

In the subroutine, the difference between the adjacent variables $P_i$ and $P_{i+1}$ is then calculated at step S70. judgement whether or not there is a point where the difference between variables $P_{i+1} - P_i$ changes from a negative to positive value, that is, a minimum value, is carried out at next step S71. Since the distribution $P_{xi}$ around the X axis does not have any minimum value $P_s$ so that the result is NO in the case of FIG. 17, the program returns to step S52 of the original flow chart of FIG. 18 where judgement whether or not the separation has been done is carried out.

Since the distribution around the X axis $P_{xi}$ does not have any minimum value $P_s$, the answer to the separation question at step S52 is NO. The program then goes to step S53 where the distribution around the Y axis $P_{yi}$ designated by reference numeral 40-2 in FIG. 17 is obtained. The subroutine of FIG. 19 is executed again at next step S54. Since the distribution around the Y axis $P_{yi}$ does not have any minimum value $P_s$ in the case of FIG. 17 and the judgement at step 55 of the original flow chart is NO, the program goes to step S56.

The distribution around the X' axis which is 45° rotated with respect to the X axis of FIG. 17, $P_{x'i}$, designated by 40-3 in FIG. 17 is obtaind at step S56. The subroutine of FIG. 19 is executed with respect to the distribution $P_{xi}$, at the next step S57. By the execution of this subroutine, the distribution $P_{x'i}$ around the X' axis, does not have any minimum value Ps and the judgement at next step S58 is NO so that the program goes to next step S59.

The distribution $P_{y'i}$ around the Y' axis, which is 45° rotated with respect to the Y axis of FIG. 17 and is designated by 40-4 in FIG. 17, is obtained at step S59. The subroutine of FIG. 19 is executed again at next step S60.

In the execution of the subroutine relating to the distribution around the Y' axis there is a minimum value Ps and the judgement at step S71 is YES. Detection of two maximum values $P_Lk$ and $P_Ll$ is carried out at next step S72. The judgement whether or not $P_Lk > P_Ll$ is carried out at step S73. If the judgement is YES, a smaller $P_Ll$ is input as $P_L$ at next step S74. If the judgement result is NO, a smaller $P_Lk$ is input to $P_L$ as $P_L$ at step S75 in a similar manner.

Thereafter $\alpha P_L$, which is a $P_L$ multiplied by a factor $\alpha$ (for example 0.5), is compared with Ps at step S76. If $\alpha P_L > P_S$ then YES the result of step S76 is, an separation is carried out by using a separation line designated by reference $L_s$ in FIG. 17. The integration of $P_i$ is divided at a position j of the minimum value $P_s$ of the marginal distribution. The number of numerals "1", $$\sum_{i=1}^{j} Pi \text{ and } \sum_{i=j+1}^{n} Pi$$

are calculated respectively wherein n represents the number of the marginal distributions.

After obtaining respective sizes of the laminae divided by the separation line $L_s$ as described above, the program returns to step S61 of the flow chart of FIG. 18 whrein the judgement whether or not the separation has been done is carried out. Since the result is YES and the sizes of the respective separated laminae are calculated at steps S77 and S78, the numerals "1" within the frame F is changed to numerals "0" at step S63 so that the calculation of the lamina sizes represented by the video data of FIG. 17 is completed.

Since the laminae which are represented by the data shown in FIG. 15 cannot be separated and the judgement at steps S52, S55, S58 and S61 are all NO, the numeral "1" within the frame F is changed to "0" at step 63 after the number of numerals "1" in the frame F has been counted at step S62.

In the case of FIG. 17, there was a minimum value Ps in the distribution around the Y' axis $P_{y'i}$. If this is a minimum value on X, Y or X' axis, the judgement at step 52, 55 or 58 would be YES and the program would go to step S63 from the step 52, 55 or 58.

The afore-mentioned separation processing can calculate the size of a lamina by preliminarily dividing a lamina which originally has a constricted part at the center thereof and will be divided into two parts, as well as overlapped laminae, so that it is very rational.

As described above in accordance with the present invention, the measurement of the lamina size distribution is carried out by a video signal converted by a television camera in a non-contact and non-destructive manner. Accordingly, the apparatus carrying out the present process is made compact and the occurrence of vibrations, noise and dust may be suppressed to a minimum. Measurement error due to water contained in lamina, mixed ribs and clogging of a vibration sieve may be eliminated so that the total measurement error may be reduced. Data on desired size ranges which could not heretofore have been obtained can be obtained.

Since the lamina size is calculated by video data processing by using a novel system which is referred to as a framing system, in which each lamina is framed in accordance with a process of the present invention, the system requires a minimum memory capacity and is effective to provide a compact and economical apparatus for carrying out the present process as well as shortening the measurement time.

Measurement error may be furthermore reduced by using an additional separation technique of the overlapped laminae.

What is claimed is:

1. A process for measuring size distribution of leaf products and articles comprising the steps of
   (a) uniformly spreading sampled laminae over a conveyor and transporting the same;
   (b) imaging a conveyed lamina at a detection region having a predetermined area by using a television camera each time when the lamina moves by a length corresponding to that of the detection region;
   (c) storing in a memory binary video data, each having one of two values, which are obtained by conversion of a video signal obtained by the imaging step;
   (d) processing the stored video data to encircle by a rectangular frame a contiguous group of data each having a first value of the two values of binary data which correspond to the lamina;
   (e) counting the number of contiguous ones of the binary data having said first value;
   (f) converting the contiguous ones of the binary data in the frame into the other of said two values of the binary data after the counting step;
   (g) successively carrying out the same processing of different contiguous groups of binary data to calculate the size of respective laminae; and
   (h) determining the distribution of the laminae sizes upon the basis of the calculation results.

2. A process for measuring size distribution of leaf products and articles as recited in claim 1 comprising the further step of providing the rectangular frame encircling the contiguous group of data having said first binary value with a size determined as a function of the contiguous group of data.

3. A process for measuring size distribution of leaf products and articles comprising the steps of
   (a) uniformly spreading sampled lamina over a conveyor and transporting the same;
   (b) imaging the conveyed lamina at a detection region having a predetermined area by means of a television camera each time when the lamina move by a length corresponding to that of the detection region;
   (c) storing in a memory binary video data, each having one of two values, which are obtained by conversion of a video signal obtained by the imaging step;
   (d) processing the stored video data to encircle by a rectangular frame continuous ones of the binary data which correspond to the lamina;

(e) obtaining a distribution of the continuous set of the binary data in the frame along a plurality of array axes;

(f) separating the continuous ones of the binary data within the frame at a valley and counting the number of the separated continuous ones of the binary data when two conditions are met, specifically that the distribution has at least two peaks and that a predetermined relation exists between the peaks and the valley;

(g) counting the number of the continuous ones of the binary data within the frame when said conditions are met;

(h) converting the ones of the binary data within the frame into the other ones of the binary data after the counting step;

(i) thereafter successively carrying out the same operations on different continuous ones of the binary data to calculate the size of respective lamina; and (j) measuring the lamina size distribution based upon the calculation results.

4. A process for measuring size distribution of leaf products and articles comprising the steps of:

(a) uniformly spreading sampled lamina over a conveyor and transporting the same;

(b) imaging the conveyed lamina at a detection region having a predetermined area by means of a television camera each time the lamina move by a length corresponding to the length of the detection region;

(c) storing in a memory binary video data, each datum having one of two values obtained by conversion of a video signal obtained by the imaging step;

(d) processing the stored video data to encircle by a frame continuous ones of the binary data which correpsond to the lamina;

(e) varying the size of the encircling frame as a function of the size of the lamina being encircled;

(f) obtaining a distribution of the continuous ones of the binary data in the frame along a plurality of array axes;

(g) separating the continuous ones of the binary data within the frame at a valley and counting the number of the separated continuous ones of the binary data when two conditions are met, specifically that the distribution has at least two peaks and that a predetermined relation exists between the peaks and the valley;

(h) counting the number of the continuous ones of the binary data within the frame when said conditions are met;

(i) converting the ones of the binary data within the frame into the other of the two values of the binary data after the counting step;

(j) thereafter successively carrying out the same operations on different sets of continuous ones of the binary data to calculate the size of respective lamina; and (k) measuring the lamina size distribution based upon the calculation results.

* * * * *